United States Patent
Buduson et al.

(10) Patent No.: US 12,407,080 B2
(45) Date of Patent: Sep. 2, 2025

(54) SYSTEMS AND METHODS FOR AUTONOMOUSLY ADJUSTABLE AERIAL VEHICLE ANTENNA

(71) Applicant: L3Harris Global Communications, Inc., Melbourne, FL (US)

(72) Inventors: James Buduson, North Chili, NY (US); Peter Burke, Hilton, NY (US); Joseph Majkowski, Pittsford, NY (US); Thomas Howe, Rochester, NY (US); Megan Blakeney, Rochester, NY (US); Louis Fay, Charlotte, NC (US)

(73) Assignee: L3Harris Global Communications, Inc., Melbourne, FL (US)

( * ) Notice: Subject to any disclaimer, the term of this patent is extended or adjusted under 35 U.S.C. 154(b) by 352 days.

(21) Appl. No.: 17/976,479

(22) Filed: Oct. 28, 2022

(65) Prior Publication Data
US 2024/0145896 A1 May 2, 2024

(51) Int. Cl.
*H01Q 1/28* (2006.01)
*G05D 3/20* (2006.01)
*H01Q 1/08* (2006.01)

(52) U.S. Cl.
CPC ............. *H01Q 1/087* (2013.01); *G05D 3/20* (2013.01); *H01Q 1/28* (2013.01)

(58) Field of Classification Search
CPC ................................ H01Q 1/087; H01Q 1/28
See application file for complete search history.

(56) References Cited

U.S. PATENT DOCUMENTS

| | | | |
|---|---|---|---|
| 2,036,456 A | 4/1936 | Buschbeck | |
| 2,709,220 A | 5/1955 | Spector | |
| 2,834,012 A | 5/1958 | Allen | |
| 3,268,903 A | 8/1966 | Keucken et al. | |
| 4,117,495 A * | 9/1978 | Hochstein | H01Q 9/14 343/901 |
| 5,221,930 A | 6/1993 | Scott | |
| 5,370,334 A | 12/1994 | Shinkawa et al. | |
| 5,865,390 A | 2/1999 | Iveges | |
| 8,473,017 B2 | 6/2013 | Milosavljevic et al. | |
| 9,407,000 B1 | 8/2016 | Willistein | |

(Continued)

FOREIGN PATENT DOCUMENTS

FR 2311419 A1 12/1976

OTHER PUBLICATIONS https://consumer.steppir.com/shop/vertical-antennas/bigir-mark-iv-vertical-antenna-40m-6m-package.

*Primary Examiner* — Awat M Salih
(74) *Attorney, Agent, or Firm* — Fox Rothschild LLP; Carol E. Thorstad-Forsyth

(57) ABSTRACT

Systems and methods for autonomously operating an antenna assembly. The methods comprise: obtaining, by a processor of the antenna assembly, first information comprising at least one of a value for a variable altitude of the antenna assembly, a value for a variable height of the antenna assembly above ground, a value for a variable height of the antenna assembly above sea level, a value for a variable distance of the antenna assembly from a reference object, and a first value for a variable signal frequency of a communication device; using, by the processor, the information to obtain a desired length of an antenna of the antenna assembly; and controlling, by the processor, an actuator to adjust a length of the antenna until the length reaches the desired length.

25 Claims, 13 Drawing Sheets

(56) References Cited

U.S. PATENT DOCUMENTS

| | | |
|---|---|---|
| 2009/0046032 A1 | 2/2009 | Opitz |
| 2009/0102705 A1* | 4/2009 | Obermeyer ......... G01S 13/9029 |
| | | 343/705 |
| 2017/0257165 A1* | 9/2017 | Pescod ............... H04B 10/2575 |
| 2020/0280827 A1* | 9/2020 | Fechtel .................. H04W 8/08 |

* cited by examiner

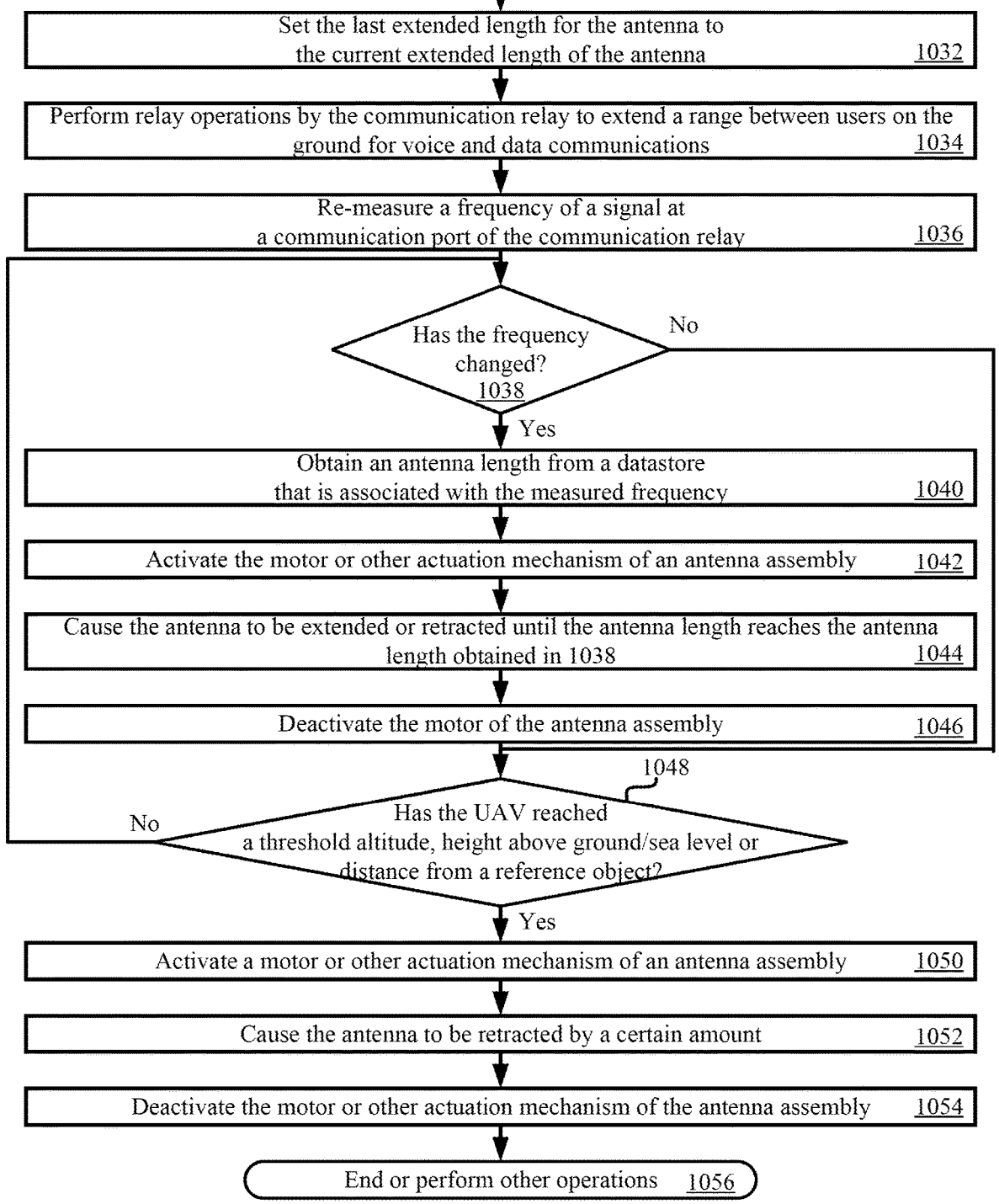

SYSTEMS AND METHODS FOR AUTONOMOUSLY ADJUSTABLE AERIAL VEHICLE ANTENNA

BACKGROUND

Statement of the Technical Field

The present document concerns antenna systems. More specifically, the present document concerns systems and methods for autonomously adjustable aerial vehicle antenna.

Description of the Related Art

Many ground radios exist for facilitating voice and data communications between users. A clear Line of Sight (LoS) between two radios is ideal for such communications, but impractical in many applications. For example, the radios may experience Line of Sight (LoS) obstructions effecting the reliability of wireless communications therebetween. The obstructions include distance, terrain (e.g., foliage and mountains) and human made objects (e.g., buildings). Thus, there is a need for a solution to improve the reliability of wireless communications between radios when they do not have clear LoS to each other.

Some solutions address the reliability issue by providing communication relays hosted by Unmanned aerial vehicles (UAVs) to extend the dismounted communication distances between the radios. The performance of these relays is limited because their antennas are required to be compact and flexible to survive take off and landing of the UAVs.

SUMMARY

This document concerns systems and methods for autonomously operating an antenna assembly. The methods comprise: obtaining, by a processor of the antenna assembly, first information comprising at least one of a value for a variable altitude of the antenna assembly, a value for a variable height of the antenna assembly above ground, a value for a variable height of the antenna assembly above sea level, a value for a variable distance of the antenna assembly from a reference object, and a first value for a variable signal frequency of a communication device; using, by the processor, the information to obtain a desired length of an antenna of the antenna assembly; and controlling, by the processor, an actuator to adjust a length of the antenna until the length reaches the desired length.

The present document also concerns an antenna assembly. The antenna assembly comprises: an antenna with a variable length; an actuator coupled to the antenna; a processor coupled to the actuator; and a non-transitory computer-readable storage medium comprising programming instructions that are configured to cause the processor to implement a method for autonomously adjusting the variable length of the antenna. The programming instructions comprise instructions to: obtain first information comprising at least one of a value for a variable altitude of the antenna assembly, a value for a variable height of the antenna assembly above ground, a value for a variable height of the antenna assembly above sea level, a value for a variable distance of the antenna assembly from a reference object, and a first value for a variable signal frequency of a communication device; use the information to obtain a desired length of an antenna of the antenna assembly; and control the actuator to cause an adjustment of the variable length of the antenna until the variable length reaches the desired length.

The present document also concerns an unmanned aerial vehicle. The unmanned aerial vehicle comprises a fuselage, avionic electronics disposed in the fuselage, a payload physical joined with the fuselage, and at least one power source configured to supply power to the avionic electronics and payload. The payload comprises a communication relay and an antenna assembly coupled to the communication relay. The communication relay is configured to perform relay operations to extend a range between users of a communication relay link for voice and data communications. The antenna assembly comprises an antenna with a variable length, an actuator coupled to the antenna, a processor coupled to the actuator, and a non-transitory computer-readable storage medium comprising programming instructions that are configured to cause the processor to implement a method for autonomously adjusting the variable length of the antenna.

The programming instructions comprise instructions to: obtain first information comprising at least one of a value for a variable altitude of the antenna assembly, a value for a variable height of the antenna assembly above ground, a value for a variable height of the antenna assembly above sea level, a value for a variable distance of the antenna assembly from a reference object, and a first value for a variable signal frequency of a communication device; use the information to obtain a desired length of an antenna of the antenna assembly; and control the actuator to cause an adjustment of the variable length of the antenna until the variable length reaches the desired length.

BRIEF DESCRIPTION OF THE DRAWINGS

This disclosure is facilitated by reference to the following drawing figures, in which like numerals represent like items throughout the figures.

FIGS. 10A-10B (collectively referred to as "FIG. 10") provide a flow diagram of a method for operating an antenna assembly.

DETAILED DESCRIPTION

Figure 1:
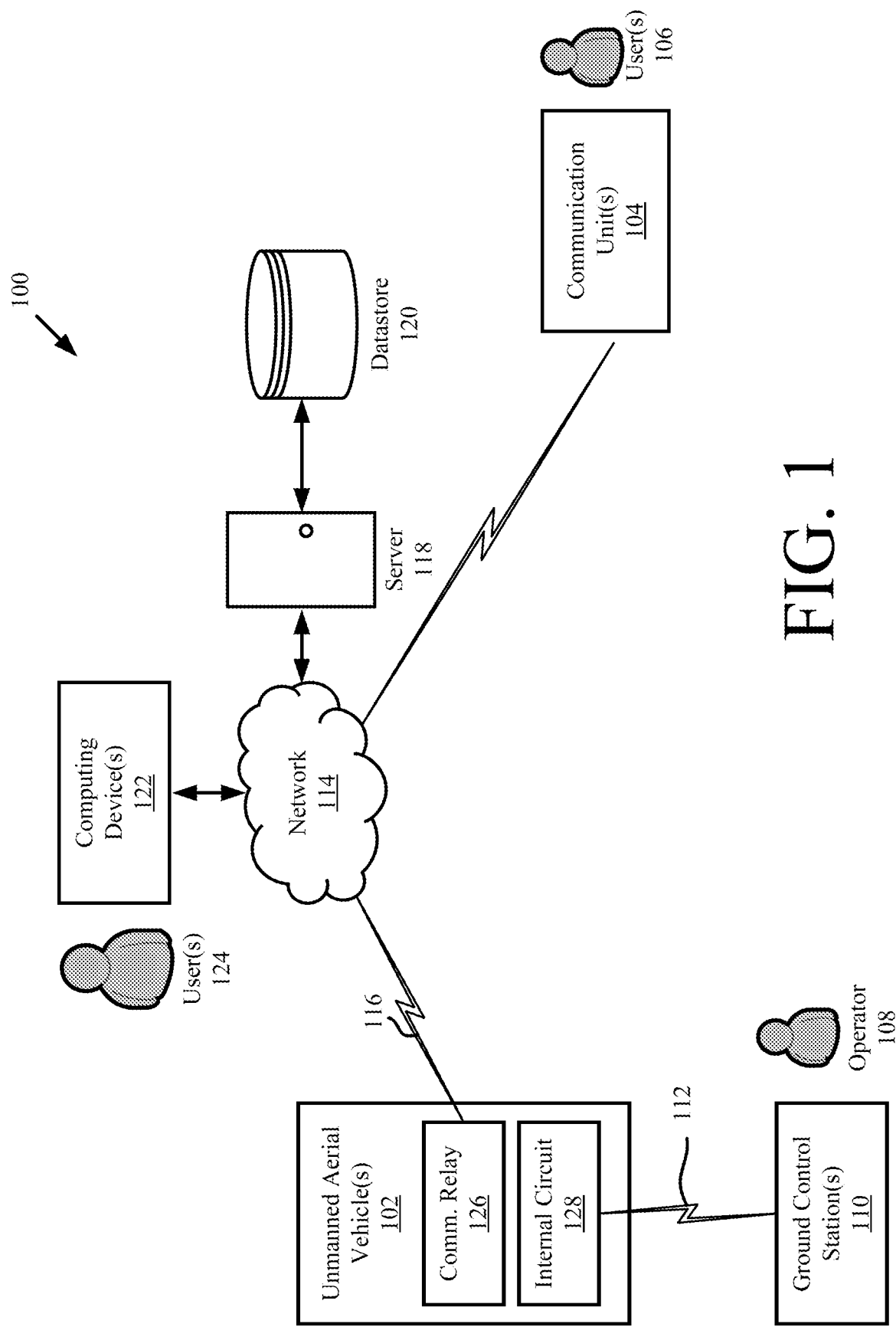
FIG. 1 provides an illustration of a system.

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in different scenarios. While the various aspects are presented in the drawings, the drawings are not necessarily drawn to scale unless specifically indicated.

Reference throughout this specification to features, advantages, or similar language does not imply that all the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Many ground radios exist for facilitating voice and data communications between users. A clear LoS between two radios is ideal for such communications, but impractical in many applications. For example, the radios may experience LoS obstructions effecting the reliability of wireless communications therebetween. The obstructions include distance, terrain (e.g., foliage and mountains) and human made objects (e.g., buildings). Thus, there is a need for a solution to improve the reliability of wireless communications between radios when they do not have clear LoS to each other.

The present solution addresses the reliability issue by providing communication relays hosted by UAVs to extend the dismounted communication distances between the radios. The communication relays are designed such that the size, weight and power limitations of the UAVs are satisfied even when the communication relays are disposed therein. The length of an antenna of a communication relay is autonomously adjustable while the UAV is in flight. This autonomous adjustment ensures that the antenna will not be damaged or otherwise deformed during take-off and landing of the UAV. The manner in which the autonomous adjustment of antenna length is achieved will become evident as the discussion progresses.

Referring now to FIG. 1, there is provided an illustration of a system 100 implementing the present solution. System 100 comprises a plurality of UAV(s) 102, communication device(s) 104, 122, ground control station(s) 110, and/or a server 118. The UAV 102 does not have any onboard human pilot, crew members and/or passengers. The UAV can include, but is not limited to, an autonomous aerial vehicle and/or a remotely-piloted aerial vehicle. In the remotely-piloted scenarios, an operator 108 (e.g., a Remote Pilot In Command (RPIC)) can remotely control flight operations of the UAV by using ground control station 110 that is communicatively coupled to an internal circuit 128 of the UAV 102 via command and control link 112. The internal circuit 128 includes the avionics payload. The avionics payload comprises avionic electronics, i.e., hardware and/or software facilitating positioning, navigation, timing and other functionalities of the UAV. The UAV can have any classification (e.g., a Group 1-5 classification, and/or size classification (e.g., very small, small, medium, and/or large)).

During flight, the UAV 102 can act as an airborne relay to wirelessly connect to communication unit(s) 104 (e.g., terrestrial radios) located on the ground at locations in which wireless communications therefrom are masked or screened by the LoS obstructions (e.g., distance, terrain (e.g., foliage and mountains) and human made objects (e.g., buildings)). In this regard, a communications relay 126 is provided with the UAV. The communications relay 126 may communicate over a secure communications link 116 (e.g., a Small Secure Data Link (SSDL)), use various frequency bands (e.g., Ultra High Frequency (UHF) and Very Hight Frequency (VHF) bands), support a variety of frequencies and waveforms, and extend the range between users 106 for voice and data communications (e.g., text messages and/or imagery data) beyond the LoS range of the communication unit(s) 104. The communication unit(s) 104 can include, but is(are) not limited to, radio transceiver(s), personal computer(s), portable computer(s), desktop computer(s), smart device(s) (e.g., a smart phone), tablet(s), and/or wearable device(s) (e.g., a smart watch and/or smart goggles).

The voice and data communications may be provided to remote devices such as computing device(s) 122 and/or server(s) 118 via network 114. Network 114 can include, but is not limited to, a radio network, a cellular network, and/or the Internet. The remote devices can process and/or output the voice and data communications to users 124 thereof. The voice communications, data communications and/or analytics relating thereto can be stored in a datastore 120.

Figure 2:
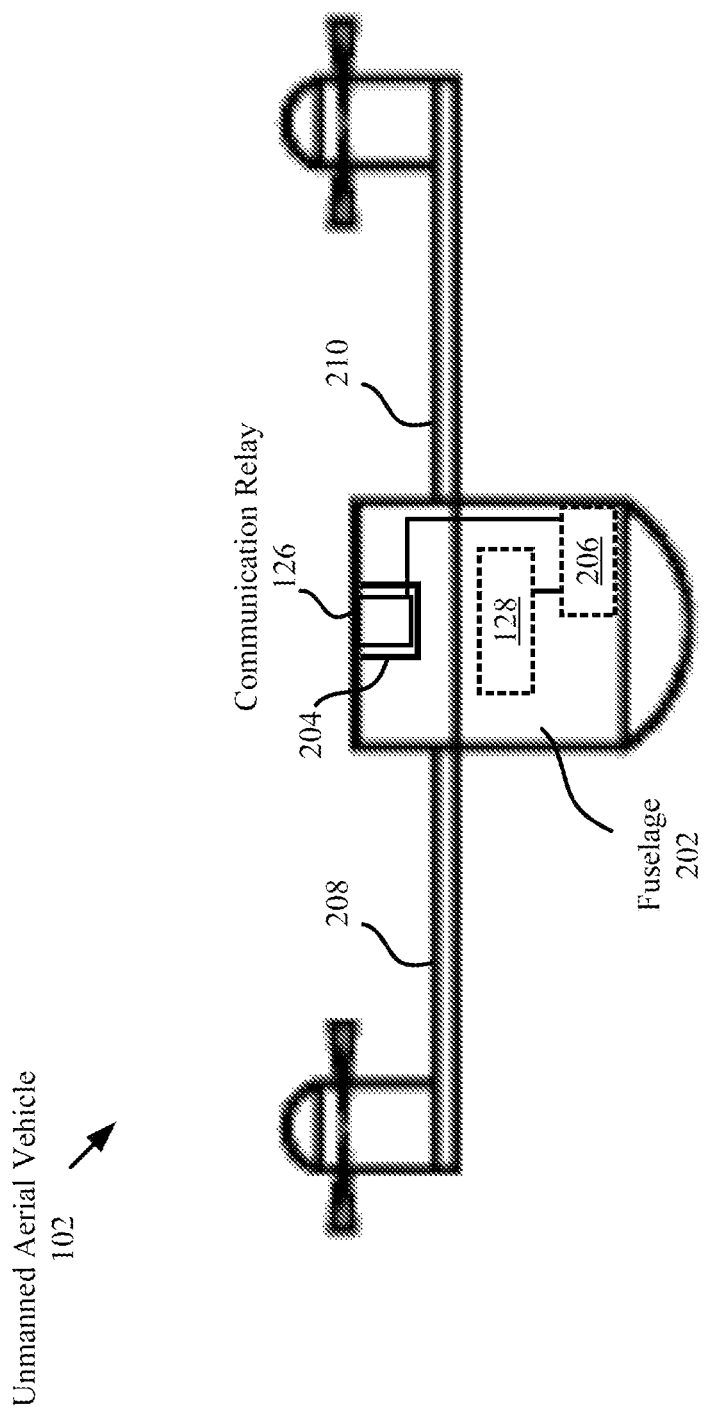
FIG. 2 provides an illustration of the Unmanned Aerial Vehicle (UAV) shown in FIG. 1.

Referring now to FIG. 2, there is shown an illustrative architecture for the UAV 102 of FIG. 1. The internal circuit 128 is disposed inside the fuselage 202 of the UAV, and the communication relay 126 may be disposed in an existing compartment 204 formed in the fuselage 202 of the UAV. The compartment 204 may be accessible from the outside of the aircraft (e.g., via a door or removable panel). An antenna assembly 206 may also be disposed in the fuselage 202 of the UAV and/or coupled to the wing(s) 208, 210 of the UAV. A more detailed block diagram of the internal circuit 128, communication relay 126 and antenna assembly 206 is provided in FIG. 3.

Figure 3:
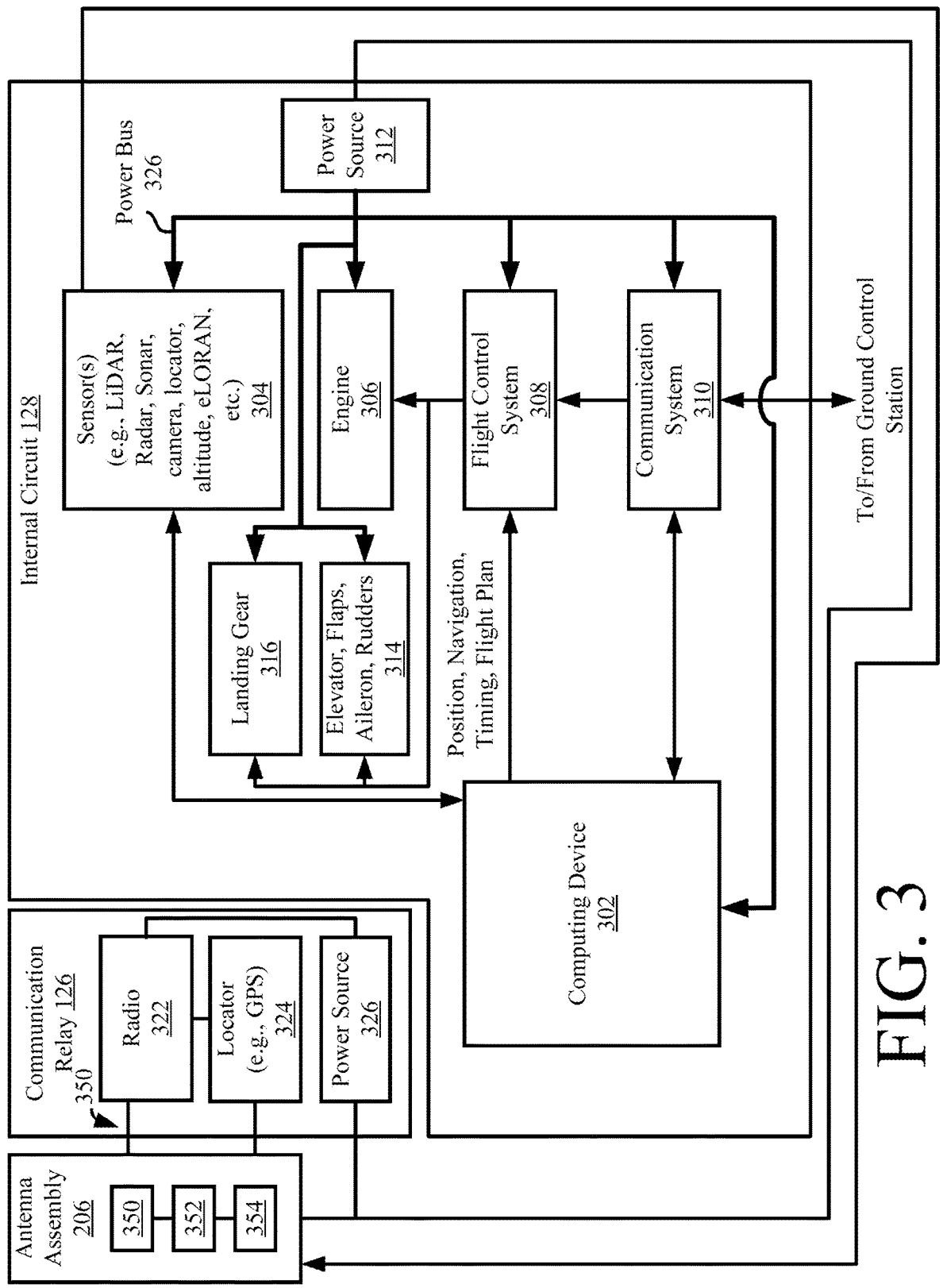
FIG. 3 provides an illustration of electronic components and/or circuits of the UAV shown in FIGS. 1-2.

As shown in FIG. 3, the internal circuit 128 comprises a computing device 302, sensor(s) 304, an engine 306, a flight control system 308, a communication system 310, a power source 312, elevators/flaps/ailerons/rudders 314, and landing gear 316. The internal circuit 128 can include more or less components than those shown and listed.

The computing device 302 comprises processor(s) that execute(s) instructions to perform the at least the following operations: receiving and processing Position, Navigation and Timing (PNT) data from the sensor(s) 304; and/or facilitating flight operations by providing the PNT data and/or a flight plan to the flight control system 308 and/or the ground control station via communication system 310. The PNT data ensures that the operator and/or the UAV knows the UAV's current position at any given time. The flight plan ensures that the UAV knows its destination relative to its current position which is useful especially in autonomous aircraft applications.

The sensor(s) 304 can include, but are not limited to, a LiDAR system, a radar system, a sonar system, a camera, a locator (e.g., GPS device), an altitude sensor, and/or an eLORAN device. It should be noted that the locator of internal circuit 128 does provide information that facilitate the operator 108 in determining the location of the UAV.

The communication system 310 provides a means to transmit PTN data and/or other information to the ground control station, and to receive command and control information from the ground control station. The command and control information is passed from the communication system 310 to the computing device 302 and/or the flight control system 308. The flight control system 308 controls operations of the engine 306, elevator/flaps/aileron/rudders 314, and/or landing gear 316 in accordance with the commands and control information received from the ground control station.

The components 302-310, 314, 316 are supplied power from a power source 312. The power source 312 can include, but is not limited to, a battery and/or an energy harvesting circuit (e.g., comprising a super capacitor to store harvested energy from heat, wind, light, RF signals, etc.). The power is supplied from the power source 312 to components 302-310 via a power bus 326.

The communication relay 126 may be independent from the internal circuit 128 and may consist of a standalone payload for the UAV. As such, the communication relay 126 is provided with another power source 326 such that it is not supplied power from the power source 312 of the UAV via power bus 326. Power source 326 can include, but is not limited to, a battery (e.g., a Lithium Polymer (LiPo) battery) and/or an energy harvesting circuit. Such a power source arrangement ensures that the components 322, 324 of the communication relay 126 continue to operate when the internal circuit 128 is no longer being supplied power from the power source 312. The components include a radio 322 and a locator 324. The locator 324 can include, but is not limited to, a GPS device. The locator 324 provides a means to allow all users 106, 124 in a communication relay link to know the location of the UAV at any given time.

The antenna assembly 206 is provided for the communication relay 126. The antenna assembly 206 includes an antenna for the radio 322 and/or an antenna for the locator 324. The antenna(s) 350 is(are) retractable into the antenna assembly and/or extendable from the antenna assembly. The transition of the antenna(s) between the retracted position(s) and extended position(s) is selectively, dynamically and/or autonomously controlled by an antenna controller 352 based on certain criteria. The antenna controller 352 can include, but is not limited to, computing device (for example, computing device 400 of FIG. 4), a processor and/or a non-transitory computer-readable storage medium comprising programming instructions that are configured to cause the processor to implement methods for selectively, dynamically and/or autonomously adjusting a length of the antenna(s) 350.

The criteria can include, but is not limited to, the UAV reaching a threshold altitude, threshold distance to an object, a threshold distance above sea level, a measured frequency of a Radio Frequency (RF) port of the communication relay 126, a current position of an antenna, and/or a characteristic of an environment (for example, air pressure—air pressure decreased as altitude increases). In this regard, the antenna assembly 206 comprises one or more sensors 354 to detect at least a signal frequency at a communications portion of the communication relay 126, an altitude, a height above sea level, a time of flight of a signal from the UAV to a surface (for example, a ground surface), a distance from the UAV to an object, an air pressure, and/or an antenna position. Such sensors can include, but are not limited to, altitude sensor(s), pressure sensor(s), radar system(s), Lidar system(s), acoustic system(s), distance sensor(s), and signal frequency sensor(s). The length of each antenna can be automatically adjusted for use with VHF and UHF radio waves.

Figure 4:
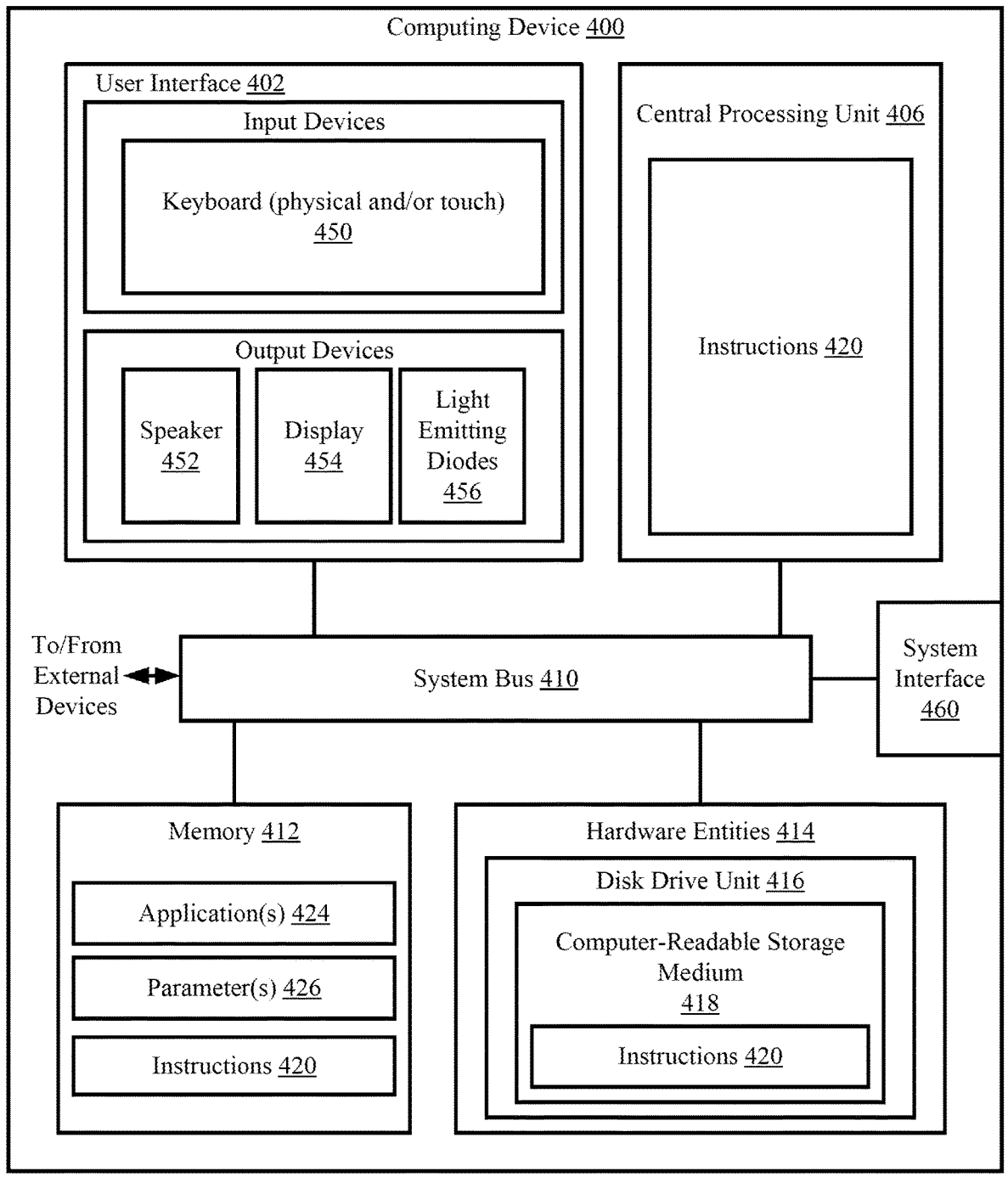
FIG. 4 provides a block diagram of an illustrative architecture for a computing device.

Referring now to FIG. 4, there is shown an illustrative architecture for a computing device 400. The communication unit(s) 104 of FIG. 1, ground control station 110 of FIG. 1, server 118 of FIG. 1, computing device(s) 122 of FIG. 1, computing device 302 of FIG. 3 and/or antenna controller 352 of FIG. 3 is/are the same as or similar to computing device 400. As such, the discussion of computing device 400 is sufficient for understanding the components 104, 110, 118, 122 of FIG. 1 and components 302, 352 of FIG. 3.

Computing device 400 may include more or less components than those shown in FIG. 4. However, the components shown are sufficient to disclose an illustrative solution implementing the present solution. The hardware architecture of FIG. 4 represents one implementation of a representative computing device configured to receive information, process the receive information, transmit information and/or control operations of a UAV, as described herein. As such, the computing device 400 of FIG. 4 implements at least a portion of the method(s) described herein.

Some or all components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit (CPU) 406, a system bus 410, a memory 412 connected to and accessible by other portions of computing device 400 through system bus 410, a system interface 460, and hardware entities 414 connected to system bus 410. The user interface can include input devices and output devices, which facilitate user-software interactions for controlling operations of the computing device 400. The input devices include, but are not limited to, a physical and/or touch keyboard 450. The input devices can be connected to the computing device 400 via a wired or wireless connection (e.g., a Bluetooth® connection). The output devices include, but are not limited to, a speaker 452, a display 454, and/or light emitting diodes 456. System interface 460 is configured to facilitate wired or wireless communications to and from external devices (e.g., network nodes such as access points, etc.).

At least some of the hardware entities 414 perform actions involving access to and use of memory 412, which can be a Random Access Memory (RAM), a disk drive, flash memory, a Compact Disc Read Only Memory (CD-ROM) and/or another hardware device that is capable of storing instructions and data. Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Figure 5:
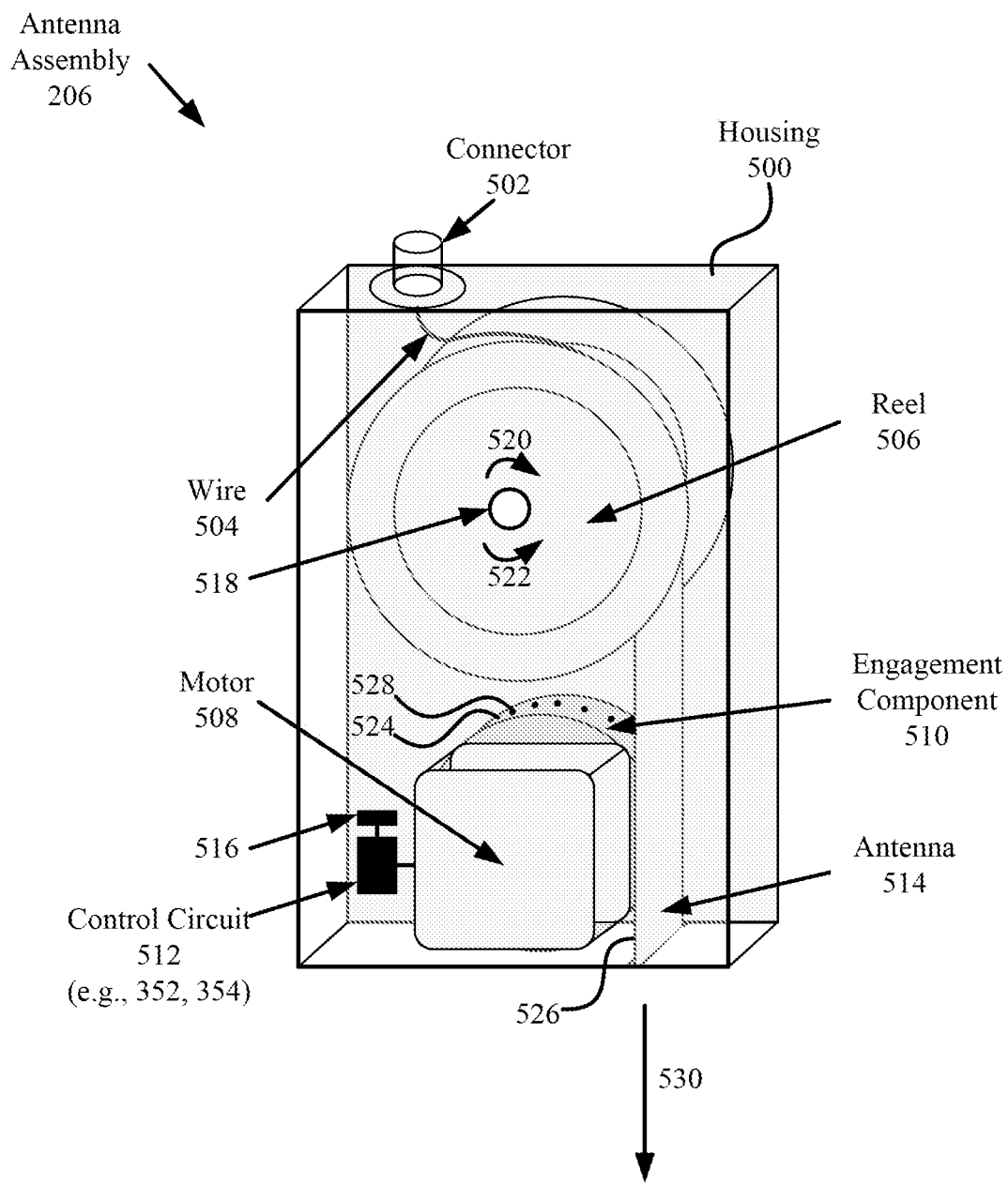
FIG. 5 provides an illustration of an architecture for an assembly with an antenna in a retracted position.
Figure 6:
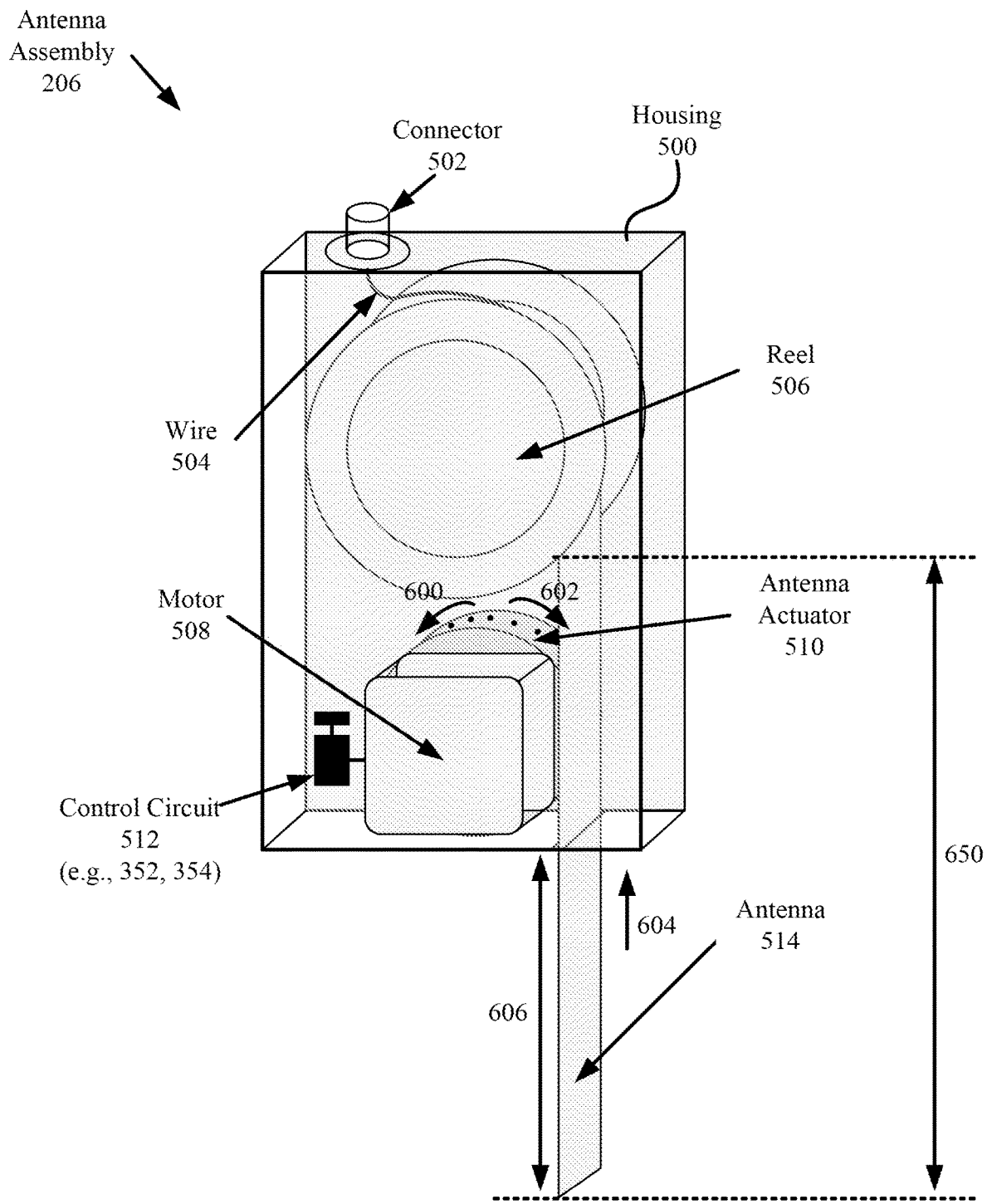
FIG. 6 provides an illustration of the assembly shown in FIG. 5 with the antenna in the extended position.

FIGS. 5-6 show an illustrative architecture for the antenna assembly 206 of FIGS. 2-3. Antenna assembly 206 comprises a housing 500 in which a connector 502 is disposed in a manner that allows a cable (not shown) to be connected thereto to facilitate communication of signals to/from an external device (for example, the communication relay 126 of FIGS. 1-3). Housing 500 can be formed of a rigid or semi-rigid material such as metal, plastic and/or rubber.

Various components 504-516 are disposed in the housing 500. These components include a reel 506, a motor 508, an antenna actuator 510, a control circuit 512 and an antenna 514. The control circuit 512 can include, but is not limited to, a computing device (for example, computing device 400 of FIG. 4), a processor and/or a non-transitory computer-readable storage medium comprising programming instructions that are configured to cause the processor to implement methods for selectively, dynamically and/or autonomously adjusting a length of the antenna(s) 514.

A power source 516 may also be provided in the housing 500 for supplying power to components 506-512. These components can additionally or alternatively be supplied power from a power source (for example, power source(s) 312 and/or 326 of FIG. 3) of the communication relay 126. The power source(s) can include, but is(are) not limited to, rechargeable batteries, super capacitors, and/or energy harvesting circuits. Energy harvesting circuits are known and may be configured to harvest energy from, for example, communication signals, wind and/or solar rays. Any known or to be known energy harvesting circuit can be used here.

A wire 504 is provided for mechanically and electrically connecting the antenna 514 to the connector 502. In this way, the antenna 514 can receive Tx signals from the communication relay 126 that are to be transmitted therefrom and pass Rx signals received thereat to the communication relay 126 for processing.

The antenna 514 is formed of one or more layers of flexible conductive material (for example, a metal layer). A non-conductive layer may be disposed on and/or encompass the flexible conductive material layer(s). The non-conductive layer may be formed of a plastic and/or rubber. The antenna 514 can be ribbon-like as shown in FIGS. 5-6 or alternatively have another shape such as a circular cross-sectional profile. The flexibility and shape of the antenna 514 allows it to be wound on and off the reel 506.

Reel 506 is coupled to the housing 500 such that it can rotate in two opposing directions 520, 522 about one or more posts 518 or other coupling means. The antenna 514 is transitionable between a retracted position shown in FIG. 5 and an extended position shown in FIG. 6 via rotation of the reel 506. For example, the antenna 514 is wound off of the reel 506 when the reel rotates in direction 520 and wound onto the reel 506 when the reel rotates in direction 522. The antenna 514 travels in direction 530 and out of the housing 500 when being wound off the wheel. In contrast, the antenna 514 travels in direction 604 and into the housing 500 when being wound onto the wheel. The present solution is not limited to the particulars of this example.

An engagement component 510 is provided to frictionally engage the antenna 514 for causing the antenna to transition between its retracted position and its extended position. The engagement component 510 can include, but is not limited to, a wheel or other circular item that is rotatable in two opposing directions 600, 602. The engagement component 510 has a surface 524 which is in direct contact with a surface 526 of the antenna 514. One or both of the surfaces 524, 526 may optionally have members 528 formed or disposed thereon in a particular pattern, an abrasive stuck (for example, sand) coupled thereto and/or is otherwise made rough to increase the frictional engagement between the engagement component 510 and the antenna 514.

A motor 508 is provided to controllably and selectively actuate engagement component 510. The motor 508 may comprise a gear, articulating linkage and/or other means for causing rotation of the engagement member about a post (now visible in FIGS. 5-6). Operation of the motor 508 is controlled by the control circuit 512.

Control circuit 512 operates motor 508 so that the antenna 514 is in its retracted position when the UAV is taking off and/or landing. The length 606 of the antenna outside of the housing 500 is adjusted while the UAV is in flight above a threshold altitude. The length 606 is adjustable to ensure that the antenna operates efficiently at any frequency of a plurality of frequencies. The frequencies can be in the VHF band and/or the UHF band.

The amount by which the antenna's length 606 is adjusted at any given time is achieved by monitoring a frequency of a signal at an RF port of the communication relay's radio 322, an altitude of the UAV, a height of the UAV above sea level, a distance of the UAV from a reference object, an air pressure of a surrounding environment and/or an antenna position. This length adjustment feature of the present solution increases the performance of the antenna at least in the low VHF band as compared to prior solutions.

The present solution is not limited to the particular architecture shown in FIGS. 5-6. For example, the sensors 354 may be disposed outside of the housing 500 and/or separately coupled to the UAV.

Figure 7:
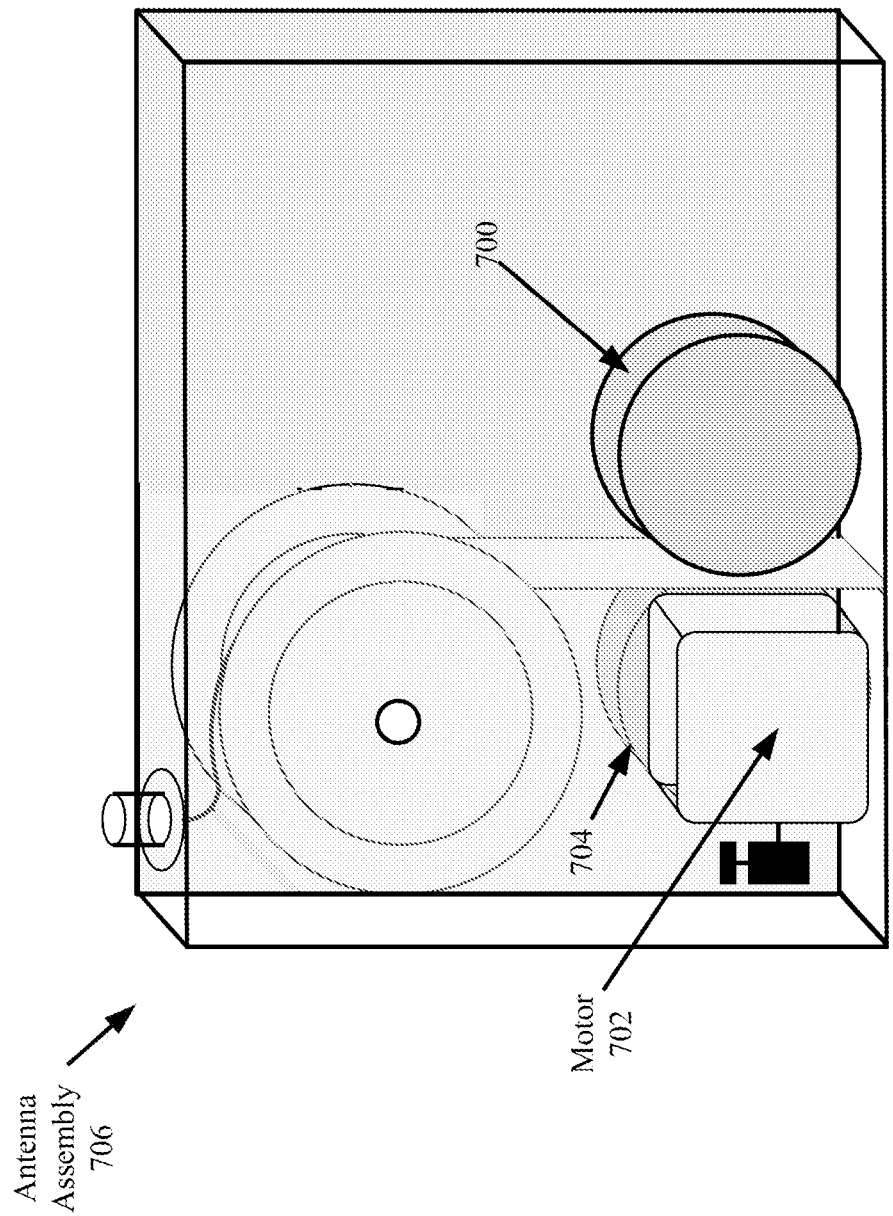
FIGS. 7-9 each provides an illustration of another architecture for an assembly.

In some scenarios, a second engagement component 700 is provided on the other side of the antenna as shown in FIG. 7. Engagement component 700 is operated by the same motor 508 that causes movement of engagement component 528 or alternatively by another motor (not shown).

Figure 8:
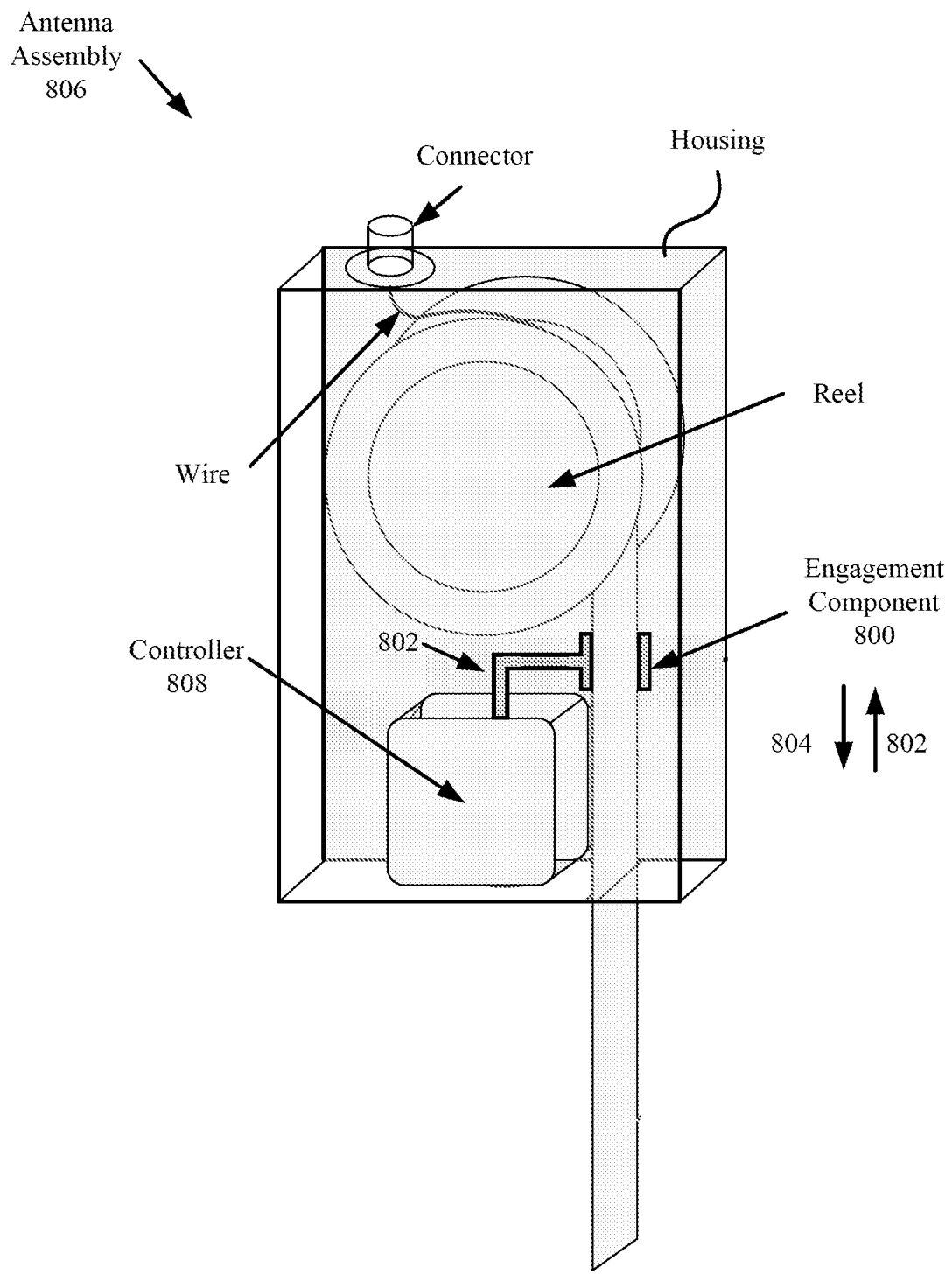

In other scenarios, the engagement component 800 comprises a clamp which is linearly movable in two opposing directions 802, 804 via an articulating arm 806 as shown in FIG. 8.

Figure 9:
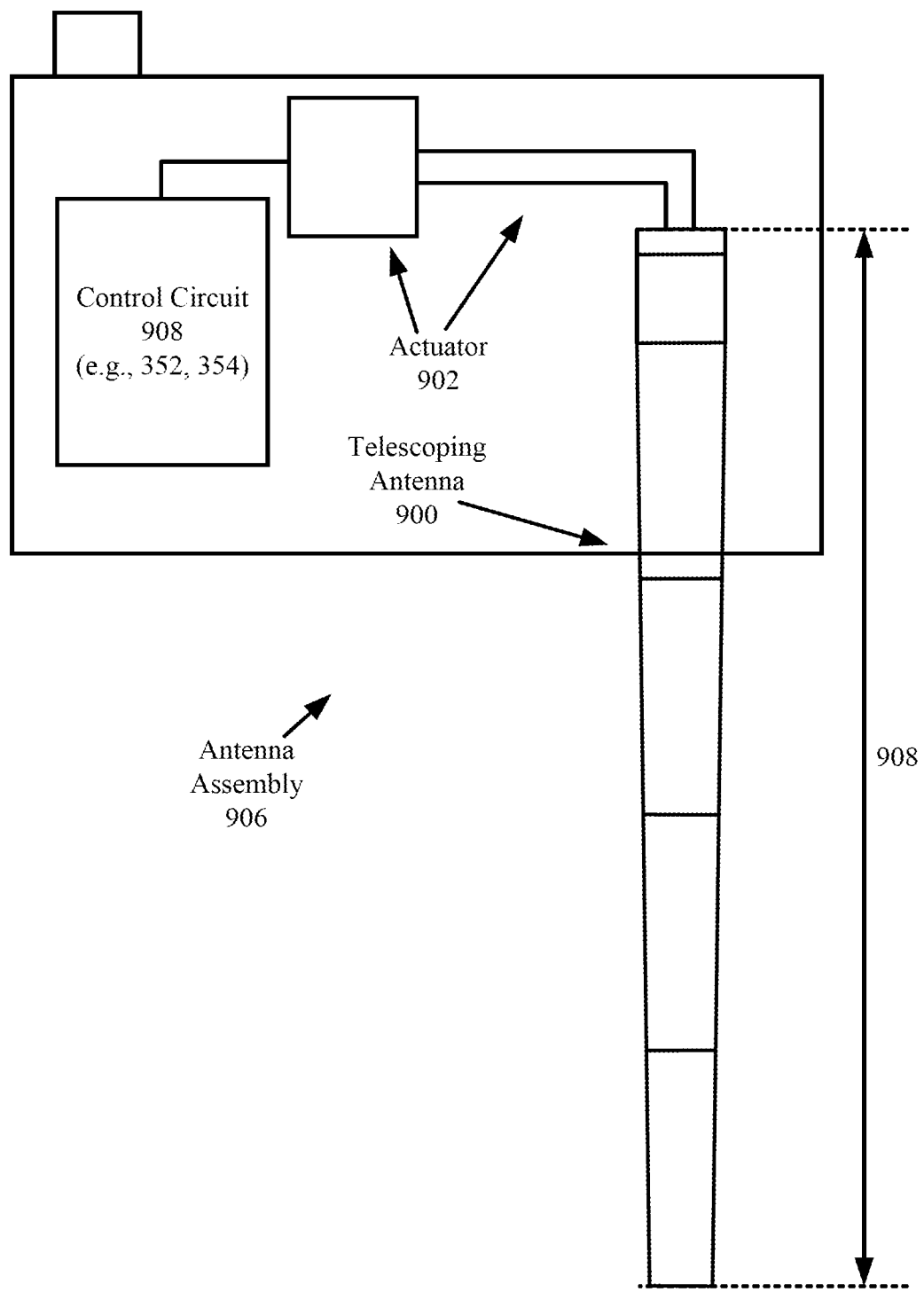

In yet other scenarios, the antenna comprises a telescoping antenna 900 as shown in FIG. 9. The telescoping antenna 900 can be extended to the position shown in FIG. 9 and retracted to a collapsed position (not shown) by actuator 902. Actuator 902 can include, but is not limited to, a motor and linkage. Actuator 902 can be controlled by the control circuit.

Figure 10A:
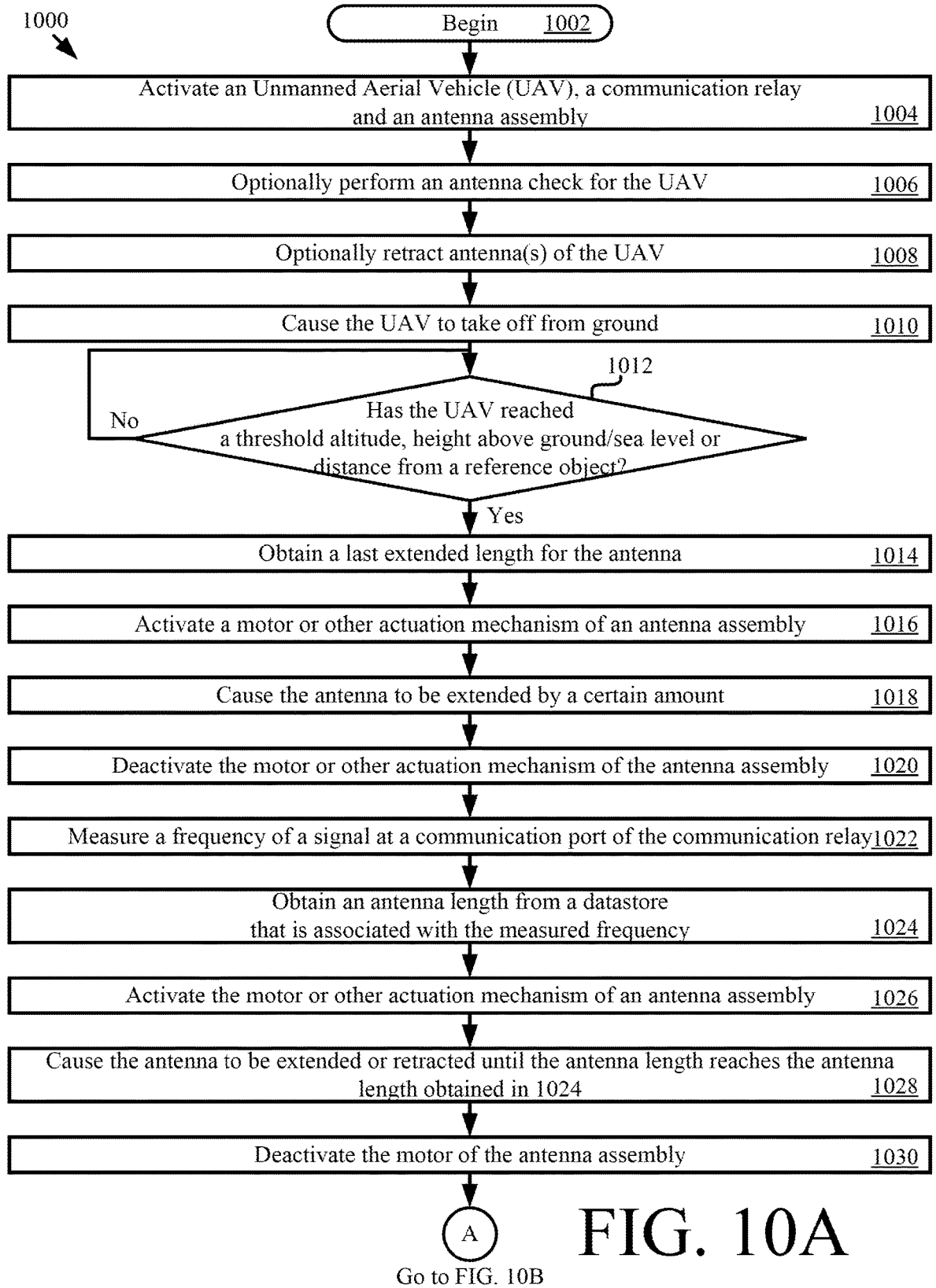

Referring now to FIG. 10, there is provided a flow diagram of an illustrative method 1000 for operating an antenna assembly (for example, antenna assembly 206 of FIGS. 5-6, 706 of FIG. 7, 806 of FIG. 8 or 906 of FIG. 9) of a UAV (for example, UAV 102 of FIG. 1). Method 1000 begins with 1002 and continues with 1004 where the UAV is activated. A communication relay (for example, communication relay 126 of FIG. 1) and/or antenna assembly may also be activated in 1004. The activated communication relay will perform relay operations while the UAV is in flight to extend a range between users on the ground for voice and data communications.

In optional 1006, a pre-flight antenna check for the antenna assembly is performed by the control circuit (for example, antenna controller 352 of FIG. 3 and/or control circuit 512 of FIGS. 5-6). The pre-flight antenna check involves detecting a position of an antenna (for example, antenna 514 of FIGS. 5-6) or an extended length the antenna. The extended length can include a length (for example, length 908 of FIG. 9) of the antenna in a partially or fully extended position, a length (for example, length 606 of FIG. 6) of the antenna which is located outside of a housing (for example, housing 500 of FIG. 5), or a length (for example, length 650 of FIG. 6) of the antenna which is wound off of the reel (for example, reel 506 of FIGS. 5-6). If the antenna of the antenna assembly is in a partially or fully extended position, then the antenna can be automatically retracted as shown by optional 1008.

In 1010, the UAV is caused to take off from ground to begin a flight mission. The control circuit of the antenna assembly performs operations in 1012 to monitor an altitude of the UAV, an air pressure of a surrounding environment, a distance of the UAV from an external object, and/or a height of the UAV above sea level. The altitude of the UAV can be monitored and obtained using data generated by an altitude sensor of the antenna assembly, data generated by a pressure sensor of the antenna assembly, data from a navigation bus of the UAV, and/or telemetry/GPS data of the UAV. The air pressure of the surrounding environment can be monitored and obtained using a pressure sensor of the antenna assembly. The distance of the UAV from an external object (for example, a building, a ground surface, etc.) can be monitored and obtained using data generated by a proximity sensor of the antenna assembly, a radar system of the antenna assembly, a Lidar system of the antenna assembly, and/or an acoustic signaling system of the Lidar system, and/or other Time of Flight (ToF) system of the antenna system. The height of the UAV above sea level using data generated by a pressure sensor of the antenna assembly.

The control circuit of the antenna assembly also performs operations to determine whether the UAV has reached a threshold altitude, a threshold height above ground or sea level and/or a threshold distance from a reference object. If not [1012:NO], then the control circuit continues with its monitoring operations. If so [1012:YES], then method 1000 continues with 1014 where the control circuit obtains a last extended length of the antenna. The last extended length of the antenna can be stored in a datastore (for example, memory 412 of FIG. 4) of the control circuit.

Thereafter, a motor (for example, motor 508 of FIG. 5-6 or 702 of FIG. 7) or other actuation mechanism (for example, actuator 802 of FIG. 8 or 902 of FIG. 9) is activated in 1016. This activation of the motor/activation mechanism causes the antenna to be extended out from the housing (for example, housing 500 of FIGS. 5-6) of the antenna assembly by a certain amount as shown by 1018. This extension can be achieved by, for example, causing the antenna to be wound off of a reel by the certain amount. This amount may be determined, for example, based a difference between the current extended length of the antenna (for example, zero) and the last extended length of the antenna (for example, 1-10 inches). Once the antenna has reached its desired position, the motor or other actuation mechanism is deactivated in 1020.

Next, in 1022, the control circuit performs operations to measure a frequency of a signal at a communication port (for example, communication port 350 of FIG. 3) of the communication relay. Any known or to be known techniques for detecting and measuring signal frequency can be used here. The control circuit then uses the measured frequency to obtain an antenna length from a datastore (for example, memory 412 of FIG. 4). A Look Up Table (LUT) operation can be used in this regard. The LUT can include a plurality of antenna lengths that are respectively associated with a plurality of frequency values. Thus, frequency can be used as an index for the LUT to facilitate identification of desired antenna lengths at any time during flight of the UAV. The motor or other actuation mechanism is activated again in 1026 to cause the antenna to be extended or retracted until the antenna length reaches the antenna length obtained in 1024, as shown by 1028. Extension of the antenna can be achieved, for example, by causing the antenna to be wound off of a reel. Retraction of the antenna can be achieved, for example, by causing the antenna to be would onto the reel. The motor or actuation mechanism is deactivated in 1030. Upon completing 1030, method 1000 continues with 1032 of FIG. 10B.

As shown in FIG. 10B, 1032 involves performing operations by the control circuit to set the last extended length for the antenna to the current extended length of the antenna. While the UAV is in flight, the communication relay continues to perform relay operations to extend a range between users on the ground for voice and data communications, as shown by 1034.

In 1036, the control circuit of the antenna assembly performs operations to obtain another measurement of the signal frequency at the communication port of the communication relay. This signal frequency measurement is compared to the previous frequency measurement obtained in 1022 of FIG. 10A to determine whether the frequency at the communication port has changed by a certain amount (for example, by at least 5-20 MHz). If not [1038:NO], the control circuit continues to monitor the signal frequency at the communication port and/or goes to 1048 which will be discussed below. If so [1038:YES], operations of 1040-1046 are performed to automatically adjust the length of the antenna while the UAV is in flight and without any human intervention. Operations of 1040-1046 are the same as or substantially similar to operations 1024-1030 of FIG. 10A. Operations of 1036-1046 can be performed continuously or periodically throughout flight of the UAV.

The control circuit of the antenna assembly also continuously, periodically or responsively to a trigger event monitor the following parameters throughout flight of the UAV: an altitude of the UAV, a height of the UAV above ground, a height of the UAV above sea level, and/or a distance of the UAV from a reference object. The trigger event can include, but is not limited to, the initiation of a descent or landing operations by the UAV. Information about the occurrence of the trigger event can be communicated from the internal circuit (for example, circuit 128 of FIG. 1) to the antenna assembly. Results of this monitoring are used in 1048 to detect when the UAV has reached a threshold altitude, a threshold height above ground, a threshold height above sea level, and/or a threshold distance from an object. These threshold values can be same as or different than those used in 1012 of FIG. 10A. If not [1048:NO], the control circuit continues to perform its monitoring operations and/or return to 1038.

If so [1048:YES], the control circuit performs operations of 1050-1054 to: activate the motor or other actuation mechanism of the antenna assembly; cause the antenna to be retracted into the housing of the antenna assembly by a certain amount; and deactivate the motor or other actuation mechanism of the antenna assembly. The retraction of the antenna can be achieved, for example, by causing the antenna to be would onto the reel. Subsequently, 1056 is performed where method 1000 ends or other operations are performed (for example, deactivate the antenna assembly and/or return to 1004 of FIG. 10A).

Figure 11:
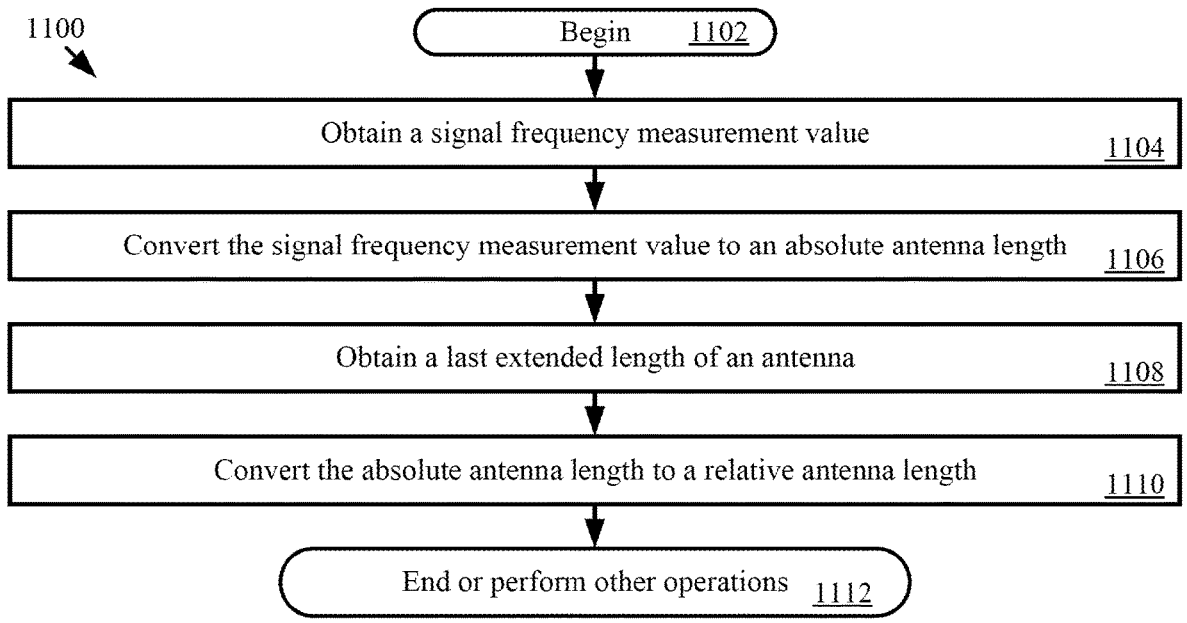
FIG. 11 provides a flow diagram of an illustrative method for determining how much an antenna is to be extended or retracted.

Referring now to FIG. 11, there is provided a flow diagram of an illustrative method 1100 for determining how much an antenna (for example, antenna 514 of FIG. 5-6 or 900 of FIG. 9) is to be extended or retracted. Method 1100 can be performed by the control circuit (for example, control circuit 352 of FIG. 3 or 512 of FIG. 5) of the antenna assembly in blocks 1024 and/or 1040 of FIG. 10.

Method 1100 begins with 1102 and continues with 1104 where a signal frequency measurement value is obtained by the control circuit. The signal frequency measurement value is converted to an absolute antenna length in 1106. This conversion can be achieved using an LUT in which absolute antenna lengths are associated with signal frequency values. In 1108, the control circuit obtains a last extended length of the antenna for a datastore (for example, memory 412 of FIG. 4). The last extended length of the antenna is used in 1110 to convert the absolute antenna length to a relative antenna length. The relative antenna length can include, but is not limited to, (i) the difference between the last extended length of the antenna and the absolute antenna length or (ii) the difference between the absolute antenna length and the last extended length of the antenna. In scenario (i), a positive relative antenna length indicates that the antenna should be retracted by a given amount. A negative relative antenna length indicates that the antenna should be extended by the given amount. In scenario (ii), a positive relative antenna length indicates that the antenna should be extended by a given amount. A negative relative antenna length indicates that the antenna should be retracted by the given amount. Subsequent to completing 1110, 1112 is performed where method 1100 ends or other operations are performed.

Figure 12:
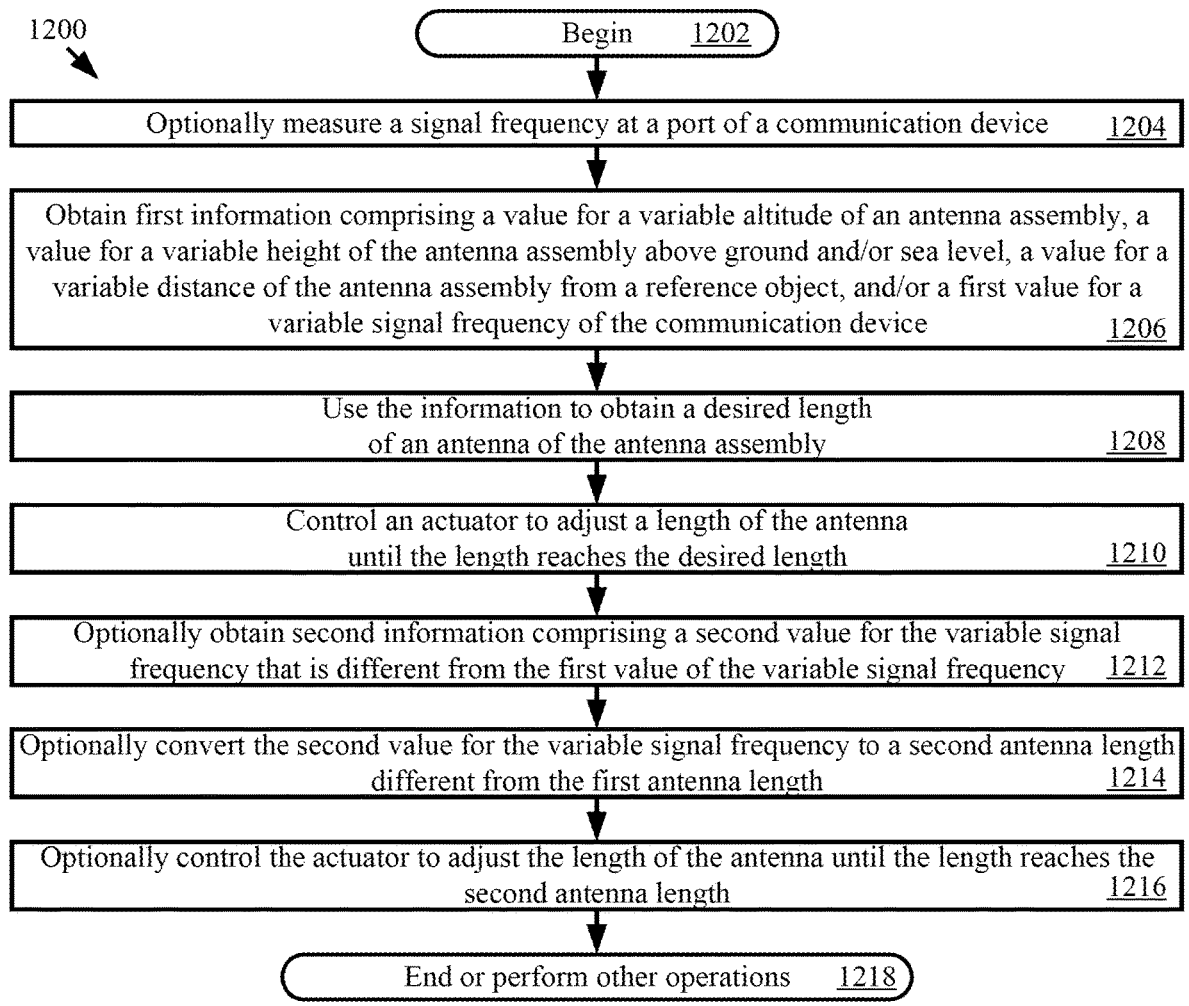
FIG. 12 provides a flow diagram of an illustrative method for autonomously operating an antenna assembly.

Referring now to FIG. 12, there is provided a flow diagram of an illustrative method 1200 for autonomously operating an antenna assembly (for example, antenna assembly 206 of FIGS. 2-3 and 5-6, 706 of FIG. 7, 806 of FIGS. 8, and/or 906 of FIG. 9). Method 1200 begins with 1202 and continues with 1204-1216. All or some of the operations of 1204-1216 may be performed by a processor (for example, antenna controller 352 of FIG. 3, CPU 406 of FIG. 4, control circuit 512 of FIGS. 5-6, controller 808 of FIG. 8, and/or control circuit 908 of FIG. 9) of the antenna assembly.

The operations of 1204-1210 comprise: optionally measuring a signal frequency at a port of a communication relay to which the antenna assembly is coupled; obtaining first information comprising at least one of a value for a variable altitude of the antenna assembly, a value for a variable height of the antenna assembly above ground, a value for a variable height of the antenna assembly above sea level, a value for a variable distance of the antenna assembly from a reference object, and a first value for a variable signal frequency of a communication device; using the information to obtain a desired length of an antenna of the antenna assembly; and controlling an actuator (for example, components 508, 510 of FIGS. 5-6, components 700, 702, 704 of FIG. 7, components 800, 802 of FIG. 8, and/or component 902 of FIG. 9) to adjust a length of the antenna until the length reaches the desired length.

In some scenarios, the desired length comprises a known last extended length of the antenna. The processor controls the actuator in 1210 to increase the length of the antenna to the known last extended length.

In those or other scenarios, the antenna assembly is coupled to an unmanned arial vehicle (for example, UAV 102 of FIG. 1) such that an altitude of the antenna assembly varies along with changes in an altitude of the UAV. The processor may control the actuator in 1210 to: decrease the length of the antenna until the antenna reaches a retracted position when the value of the variable altitude of the antenna assembly is below a threshold altitude; and/or increase the length of the antenna until the antenna reaches an extended position when the value of the variable altitude of the antenna assembly is above a threshold altitude. The antenna resides entirely within a housing of the antenna assembly when in the retracted position. The antenna at least partially extends out from a housing of the antenna assembly when in the extended position.

The desired length may be obtained, for example, by converting the first value of the variable signal frequency to a first antenna length. In this case, method 1200 may also optionally comprise operations of 1212-1216. The operations of 1212-1216 comprise: obtaining second information comprising a second value for the variable signal frequency that is different from the first value of the variable signal frequency; converting the second value for the variable signal frequency to a second antenna length different from the first antenna length; and controlling the actuator to adjust the length of the antenna until the length reaches the second antenna length.

Subsequent to completing the operations of 1210 or 1216, 1218 is performed where method 1200 ends or other operations are performed (for example, return to 1204).

In view of the forging, the present document also concerns an antenna assembly implementing the above-described methods. The antenna assembly comprises: an antenna with a variable length; an actuator coupled to the antenna; a processor coupled to the actuator; and a non-transitory computer-readable storage medium comprising programming instructions that are configured to cause the processor to implement a method for autonomously adjusting the variable length of the antenna. The programming instructions comprise instructions to: obtain first information comprising at least one of a value for a variable altitude of the antenna assembly, a value for a variable height of the antenna assembly above ground, a value for a variable height of the antenna assembly above sea level, a value for a variable distance of the antenna assembly from a reference object, and a first value for a variable signal frequency of a communication device; use the information to obtain a desired length of an antenna of the antenna assembly; and control the actuator to cause an adjustment of the variable length of the antenna until the variable length reaches the desired length.

In some scenarios, the desired length comprises a known last extended length of the antenna. The programming instructions may also comprise instructions to control the actuator to cause an increase in the variable length of the antenna to the known last extended length.

In those or other scenarios, the antenna assembly is coupled to an unmanned arial vehicle such that an altitude of the antenna assembly varies along with changes in an altitude of the unmanned aerial vehicle.

As such, the programming instructions may also comprise instructions to control the actuator to: cause a decrease in the length of the antenna until the antenna reaches a retracted position when the value of the variable altitude of the antenna assembly is below a threshold altitude; and/or cause an increase in the length of the antenna until the antenna reaches an extended position when the value of the variable altitude of the antenna assembly is above a threshold altitude. The antenna resides entirely within a housing of the antenna assembly when in the retracted position. The antenna at least partially extends out from a housing of the antenna assembly when in the extended position.

In those or other scenarios, the antenna assembly also comprises a device configured to measure a signal frequency at a port of a communication relay when the antenna assembly is coupled to the communication relay. The desired length is obtained by converting the first value of the variable signal frequency to a first antenna length. The programming instructions may further comprise instructions to: obtain second information comprising a second value for the variable signal frequency that is different from the first value of the variable signal frequency; convert the second value for the variable signal frequency to a second antenna length different from the first antenna length; and control the actuator to cause an adjustment to the length of the antenna until the length reaches the second antenna length.

The present document also concerns an unmanned aerial vehicle implementing the above-described methods. The unmanned aerial vehicle comprises a fuselage, avionic electronics disposed in the fuselage, a payload physical joined with the fuselage, and at least one power source configured to supply power to the avionic electronics and payload. The payload comprises a communication relay and an antenna assembly coupled to the communication relay. The communication relay is configured to perform relay operations to extend a range between users of a communication relay link for voice and data communications. The antenna assembly comprises an antenna with a variable length, an actuator coupled to the antenna, a processor coupled to the actuator, and a non-transitory computer-readable storage medium comprising programming instructions that are configured to cause the processor to implement a method for autonomously adjusting the variable length of the antenna.

The programming instructions comprise instructions to: obtain first information comprising at least one of a value for a variable altitude of the antenna assembly, a value for a variable height of the antenna assembly above ground, a value for a variable height of the antenna assembly above sea level, a value for a variable distance of the antenna assembly from a reference object, and a first value for a variable signal frequency of a communication device; use the information to obtain a desired length of an antenna of the antenna assembly; and control the actuator to cause an adjustment of the variable length of the antenna until the variable length reaches the desired length.

In some scenarios, the desired length comprises a known last extended length of the antenna. The programming instructions also comprise instructions to control the actuator to cause an increase in the variable length of the antenna to the known last extended length.

In those or other scenarios, the antenna assembly is coupled to an unmanned arial vehicle such that an altitude of the antenna assembly varies along with changes in an altitude of the unmanned aerial vehicle.

The programming instructions may also comprise instructions to control the actuator to: cause a decrease in the length of the antenna until the antenna reaches a retracted position when the value of the variable altitude of the antenna assembly is below a threshold altitude; and/or cause an increase in the length of the antenna until the antenna reaches an extended position when the value of the variable altitude of the antenna assembly is above a threshold altitude. The antenna resides entirely within a housing of the antenna assembly when in the retracted position. The antenna at least partially extends out from a housing of the antenna assembly when in the extended position.

In those or other scenarios, the antenna assembly also comprises a device configured to measure a signal frequency at a radio frequency port of the communication. The desired length may be obtained by converting the first value of the variable signal frequency to a first antenna length.

The programming instructions may further comprise instructions to: obtain second information comprising a second value for the variable signal frequency that is different from the first value of the variable signal frequency; convert the second value for the variable signal frequency to a second antenna length different from the first antenna length; and control the actuator to cause an adjustment to the length of the antenna until the length reaches the second antenna length.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for autonomously operating an antenna assembly, comprising:
    obtaining, by a processor of the antenna assembly, first information comprising at least one of a value for a variable altitude of the antenna assembly, a value for a variable height of the antenna assembly above ground, and a value for a variable height of the antenna assembly above sea level;
    using, by the processor, the first information to obtain a desired length of an antenna of the antenna assembly;
    controlling, by the processor, an actuator to move while in frictional driving contact with the antenna; and
    using friction between a surface of the actuator and a surface of the antenna to cause the antenna to travel in a direction for adjusting a length of the antenna until the length reaches the desired length.

2. The method according to claim 1, wherein the desired length comprises a known last extended length of the antenna and the processor controls the actuator to increase the length of the antenna to the known last extended length.

3. The method according to claim 1, wherein the antenna assembly is coupled to an unmanned arial vehicle such that an altitude of the antenna assembly varies along with changes in an altitude of the unmanned aerial vehicle.

4. The method according to claim 3, wherein the processor controls the actuator to decrease the length of the antenna until the antenna reaches a retracted position when the value of the variable altitude of the antenna assembly is below a threshold altitude, the antenna residing entirely within a housing of the antenna assembly when in the retracted position.

5. The method according to claim 3, wherein the processor controls the actuator to increase the length of the antenna until the antenna reaches an extended position when the value of the variable altitude of the antenna assembly is above a threshold altitude, the antenna at least partially extending out from a housing of the antenna assembly when in the extended position.

6. The method according to claim 1, further comprising measuring, by a component of the antenna assembly, a signal frequency at a port of a communication relay to which the antenna assembly is coupled.

7. The method according to claim 1, wherein the desired length is obtained by converting the first value of the variable signal frequency to a first antenna length.

8. The method according to claim 7, further comprising:
obtaining, by the processor, second information comprising a second value for the variable signal frequency that is different from the first value of the variable signal frequency;
converting, by the processor, the second value for the variable signal frequency to a second antenna length different from the first antenna length; and
controlling, by the processor, the actuator to adjust the length of the antenna until the length reaches the second antenna length.

9. An antenna assembly, comprising:
an antenna with a variable length;
an actuator in frictional driving contact with the antenna;
a processor coupled to the actuator; and
a non-transitory computer-readable storage medium comprising programming instructions that are configured to cause the processor to implement a method for autonomously adjusting the variable length of the antenna, wherein the programming instructions comprise instructions to:
obtain first information comprising at least one of a value for a variable altitude of the antenna assembly, a value for a variable height of the antenna assembly above ground, and a value for a variable height of the antenna assembly above sea level;
use the first information to obtain a desired length of an antenna of the antenna assembly; and
control the actuator to move while in frictional driving contact with the antenna;
wherein friction between a surface of the actuator and a surface of the antenna causes the antenna to travel in a direction so as to adjust the variable length of the antenna until the variable length reaches the desired length.

10. The antenna assembly according to claim 9, wherein the desired length comprises a known last extended length of the antenna and the programming instructions comprise instructions to control the actuator to cause an increase in the variable length of the antenna to the known last extended length.

11. The antenna assembly according to claim 9, wherein the antenna assembly is coupled to an unmanned arial vehicle such that an altitude of the antenna assembly varies along with changes in an altitude of the unmanned aerial vehicle.

12. The antenna assembly according to claim 11, wherein the programming instructions further comprise instructions to control the actuator to cause a decrease in the length of the antenna until the antenna reaches a retracted position when the value of the variable altitude of the antenna assembly is below a threshold altitude, the antenna residing entirely within a housing of the antenna assembly when in the retracted position.

13. The antenna assembly according to claim 11, wherein the programming instructions further comprise instructions to control the actuator to cause an increase in the length of the antenna until the antenna reaches an extended position when the value of the variable altitude of the antenna assembly is above a threshold altitude, the antenna at least partially extending out from a housing of the antenna assembly when in the extended position.

14. The antenna assembly according to claim 9, further comprising a device configured to measure a signal frequency at a port of a communication relay when the antenna assembly is coupled to the communication relay.

15. The antenna assembly according to claim 9, wherein the desired length is obtained by converting the first value of the variable signal frequency to a first antenna length.

16. The antenna assembly according to claim 15, wherein the programming instructions further comprise instructions to:
obtain second information comprising a second value for the variable signal frequency that is different from the first value of the variable signal frequency;
convert the second value for the variable signal frequency to a second antenna length different from the first antenna length; and
control the actuator to cause an adjustment to the length of the antenna until the length reaches the second antenna length.

17. The method according to claim 1, wherein the processor obtains the desired length of the antenna further using a value for a variable distance of the antenna assembly from a reference object, a first value for a variable signal frequency of a communication device, an air pressure of an external environment, and/or an antenna position.

18. An unmanned aerial vehicle, comprising:
a fuselage;
avionic electronics disposed in the fuselage;
a payload physical joined with the fuselage and comprising
a communication relay configured to perform relay operations to extend a range between users of a communication relay link for voice and data communications, and
an antenna assembly coupled to the communication relay and comprising
an antenna with a variable length,
an actuator in frictional driving content with the antenna,
a processor coupled to the actuator, and
a non-transitory computer-readable storage medium comprising programming instructions that are configured to cause the processor to implement a method for autonomously adjusting the variable length of the antenna, wherein the programming instructions comprise instructions to:
obtain first information comprising at least one of a value for a variable altitude of the antenna assembly, a value for a variable height of the antenna assembly above ground, and a value for a variable height of the antenna assembly above sea level;
use the first information to obtain a desired length of an antenna of the antenna assembly; and
control the actuator to move while in frictional driving contact with the antenna;
wherein friction between a surface of the actuator and a surface of the antenna causes the antenna to travel in a direction so as to adjust the variable length of the antenna until the variable length reaches the desired length;
at least one power source configured to supply power to the avionic electronics and payload.

19. The unmanned aerial vehicle according to claim 18, wherein the desired length comprises a known last extended length of the antenna and the programming instructions comprise instructions to control the actuator to cause an increase in the variable length of the antenna to the known last extended length.

20. The unmanned aerial vehicle according to claim 18, wherein the antenna assembly is coupled to an unmanned arial vehicle such that an altitude of the antenna assembly varies along with changes in an altitude of the unmanned aerial vehicle.

21. The unmanned aerial vehicle according to claim 20, wherein the programming instructions further comprise instructions to control the actuator to cause a decrease in the length of the antenna until the antenna reaches a retracted position when the value of the variable altitude of the antenna assembly is below a threshold altitude, the antenna residing entirely within a housing of the antenna assembly when in the retracted position.

22. The unmanned aerial vehicle according to claim 20, wherein the programming instructions further comprise instructions to control the actuator to cause an increase in the length of the antenna until the antenna reaches an extended position when the value of the variable altitude of the antenna assembly is above a threshold altitude, the antenna at least partially extending out from a housing of the antenna assembly when in the extended position.

23. The unmanned aerial vehicle according to claim 18, wherein the antenna assembly further comprises a device configured to measure a signal frequency at a radio frequency port of the communication.

24. The unmanned aerial vehicle according to claim 18, wherein the desired length is obtained by converting the first value of the variable signal frequency to a first antenna length.

25. The unmanned aerial vehicle according to claim 24, wherein the programming instructions further comprise instructions to:
  obtain second information comprising a second value for the variable signal frequency that is different from the first value of the variable signal frequency;
  convert the second value for the variable signal frequency to a second antenna length different from the first antenna length; and
  control the actuator to cause an adjustment to the length of the antenna until the length reaches the second antenna length.

* * * * *